United States Patent
Zhong et al.

(10) Patent No.: US 8,554,008 B2
(45) Date of Patent: Oct. 8, 2013

(54) ANTI-ALIASING SYSTEM AND METHOD

(75) Inventors: Lefan Zhong, San Jose, CA (US); Mike M. Cai, Newark, CA (US)

(73) Assignee: Vivante Corporation, Sunnyvale, CA (US)

( * ) Notice: Subject to any disclaimer, the term of this patent is extended or adjusted under 35 U.S.C. 154(b) by 626 days.

(21) Appl. No.: 12/759,575

(22) Filed: Apr. 13, 2010

(65) Prior Publication Data
US 2011/0249901 A1    Oct. 13, 2011

(51) Int. Cl.
  *G06K 9/40*    (2006.01)
  *G06K 9/48*    (2006.01)
(52) U.S. Cl.
  USPC .......................................... 382/269; 382/199
(58) Field of Classification Search
  USPC ........................... 382/269, 260, 199, 131, 128
  See application file for complete search history.

(56) References Cited

U.S. PATENT DOCUMENTS

| 4,797,943 | A | 1/1989 | Murayama et al. |
| 7,280,121 | B2 * | 10/2007 | Nakahashi et al. ........... 345/611 |
| 2002/0196256 | A1 | 12/2002 | Hoppe et al. |
| 2006/0029285 | A1 | 2/2006 | Hein et al. |
| 2007/0097140 | A1 | 5/2007 | Fenney et al. |

* cited by examiner

*Primary Examiner* — Yon Couso
(74) *Attorney, Agent, or Firm* — David R. Stevens; Stevens Law Group

(57) ABSTRACT

A system to reduce aliasing in a graphical image includes an edge detector configured to read image depth information from a depth buffer. The edge detector also applies edge detection procedures to detect an object edge within the image. An edge style detector is configured to identify a first edge end and a second edge end. The edge style detector also identifies an edge style associated with the detected edge based on the first edge end and the second edge end. The system also includes a restoration module configured to identify pixel data associated with the detected edge and a blending module configured to blend the pixel data associated with the detected edge.

20 Claims, 7 Drawing Sheets

Down Stair

Up Stair

Happy Mouth

Sad Mouth

ANTI-ALIASING SYSTEM AND METHOD

BACKGROUND

The present invention relates to systems and methods to reduce aliasing in graphical images. Aliasing refers to the distortions that occur when a computer graphic is rendered at a resolution other than the original resolution. These distortions often appear as jagged lines and jagged edges of objects. Anti-aliasing refers to the techniques used to minimize the effects, or distortions, of aliasing. For example, anti-aliasing techniques can reduce the jagged lines and jagged edges of objects. Anti-aliasing is a common technique to improve image quality for graphics and other image based applications.

There are many conventional methods to address image quality and the cost of anti-aliasing. Example methods for anti-aliasing in computer graphics applications include supersample anti-aliasing and multisample anti-aliasing. Supersample and multisample anti-aliasing are often used for complete full scene anti-aliasing. In computer graphics, full scene anti-aliasing addresses the aliasing issues at the edge of an object and at the intersection of interpenetrating objects. Supersample anti-aliasing is implemented by rendering a scene at a higher resolution and then down-converting to a lower resolution output. In order to render the scene at a higher resolution, subsamples are used by taking more samples than would ordinarily be used for a single pixel. Mulitsample anti-aliasing is similar to supersample anti-aliasing, except that it is achieved at least partially through hardware optimization. In general, multisample anti-aliasing is less computationally complex than supersample anti-aliasing at the same performance and quality levels because of these hardware optimizations. Therefore, multisample anti-aliasing is typically implemented, instead of supersample anti-aliasing, in many modern computer graphics systems.

For supersample and multisample anti-aliasing, the quality of the image is highly dependent on the number of samples or subsamples used. Using a larger number of samples or subsamples generally produces a higher quality image. However, using a larger number of samples or subsamples consumes more memory resources for storing the samples and more bandwidth to communicate the increased sample or subsample data. Additionally, using a larger number of samples or subsamples consumes significant computational resources, such as resources of the central processing unit (CPU) or the graphics processing unit (GPU).

BRIEF DESCRIPTION OF THE DRAWINGS

Throughout the description, similar reference numbers may be used to identify similar elements.

DETAILED DESCRIPTION

The systems and methods described herein reduce aliasing in graphical images without significantly increasing memory or bandwidth requirements. These systems and methods detect object edges and identify an edge style based on neighboring edge pixels. Based on the identified edge style, the described systems and methods attempt to recover pixel data in the area covered by the object. Blending and/or filtering operations are then performed on the object edges.

Figure 1:
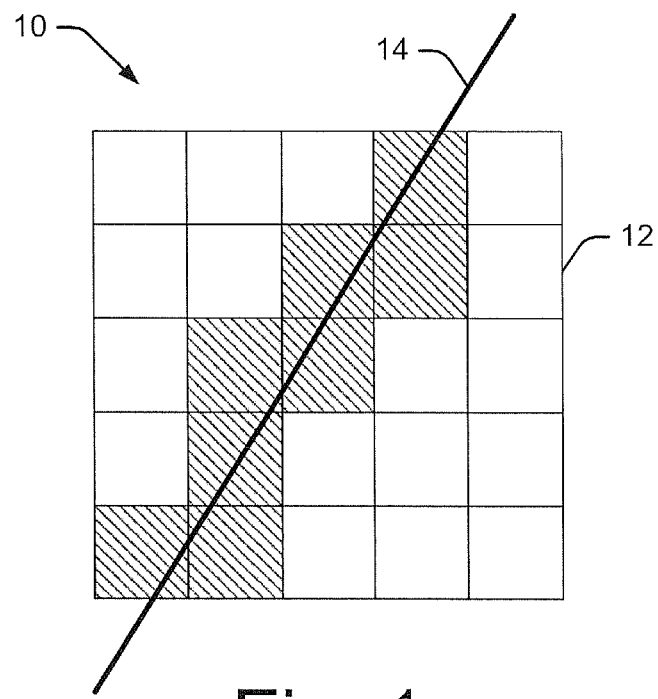
FIG. 1 depicts a schematic diagram of one embodiment of a line rendering using a plurality of pixels to render a line.

FIG. 1 depicts a schematic diagram of one embodiment of a line rendering 10 using a plurality of pixels 12 to render a line 14. Each pixel 12 is represented by a square, and the pixels 12 that correspond to line 14 are shown hatched to indicate that the designated pixels 12 would be colored (e.g., different from a background color) to represent line 14. Since pixels 12 are square, the line rendering 10 represents line 14 using a group of square pixels 12 arranged approximately along the path of line 14. Depending on the thickness and orientation of line 14, the pixels 12 may or may not be able to smoothly represent line 14 in the pixel rendering 10. The jagged edges of the designated pixels 12 representing line 14 illustrate an example of aliasing. In one embodiment, when rendering a line having a particular width (or thickness), pixels are rendered if the center of the pixel is covered by the line.

Figure 2:
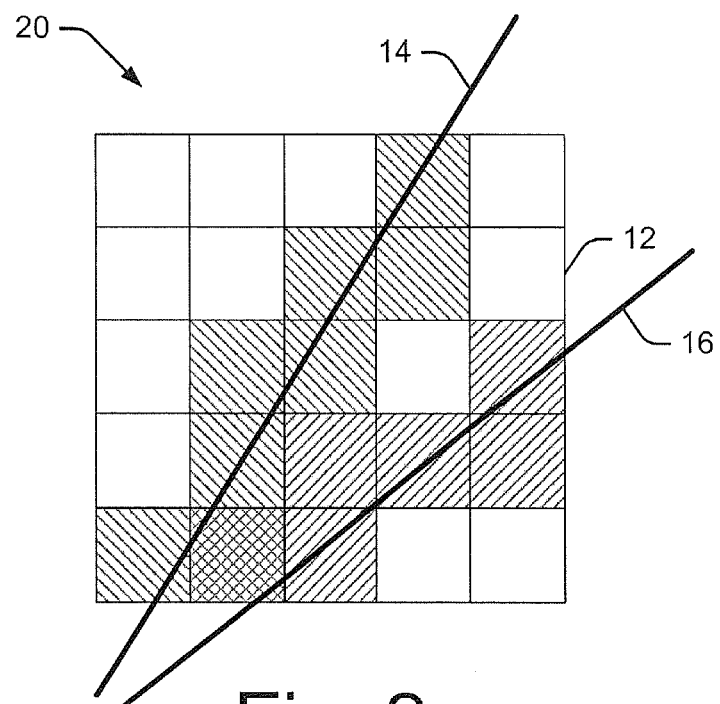
FIG. 2 depicts a schematic diagram of another embodiment of a line rendering using a plurality of pixels to render two lines.

FIG. 2 depicts a schematic diagram of another embodiment of a line rendering 20 using a plurality of pixels 12 to render two lines 14 and 16. The first line 14 is the same as line 14 shown in FIG. 1. The second line 16 is shown using a distinct hatching pattern. In some embodiments, the distinct hatching pattern could designate a distinct color from the color used to render the first line 14. For example, the first line 14 may be rendered with blue pixels 12, and the second line 16 may be rendered with red pixels 12. Where a pixel 12 is used to render both the first line 14 and the second line 16, the pixel 12 is shown cross-hatched. In this case, the cross-hatched pixel 12 may be rendered with a blue pixel 12, a red pixel 12, or some combination of blue and red (e.g., purple).

Due to the aliasing of the line rendering 20, some representations may appear to have distortions. For example, the line rendering 20 may appear to render the first line 14 and the second line 16 in a manner that gives the appearance that the lines 14 and 16 intersect near the cross-hatched pixel 12, separate moving up and to the right, and then intersect again where the corners of the differently hatched pixels 12 touch. In other words, the unhatched pixel 12 between the lines might appear to be a hole in the intersecting lines. This distortion is an effect of aliasing.

It should be noted that anti-aliasing, in computer graphics, deals with the aliasing issues at the edges of objects as well as at the intersection of interpenetrating objects. The aliasing issues within an object (i.e., not at the object edges) are typically resolved by using a texture re-sampling filter. Alternatively, or in addition to texture re-sampling, smooth shading (e.g., Garoud and Phong shading) can be used to resolve aliasing issues within an object.

Figure 3:
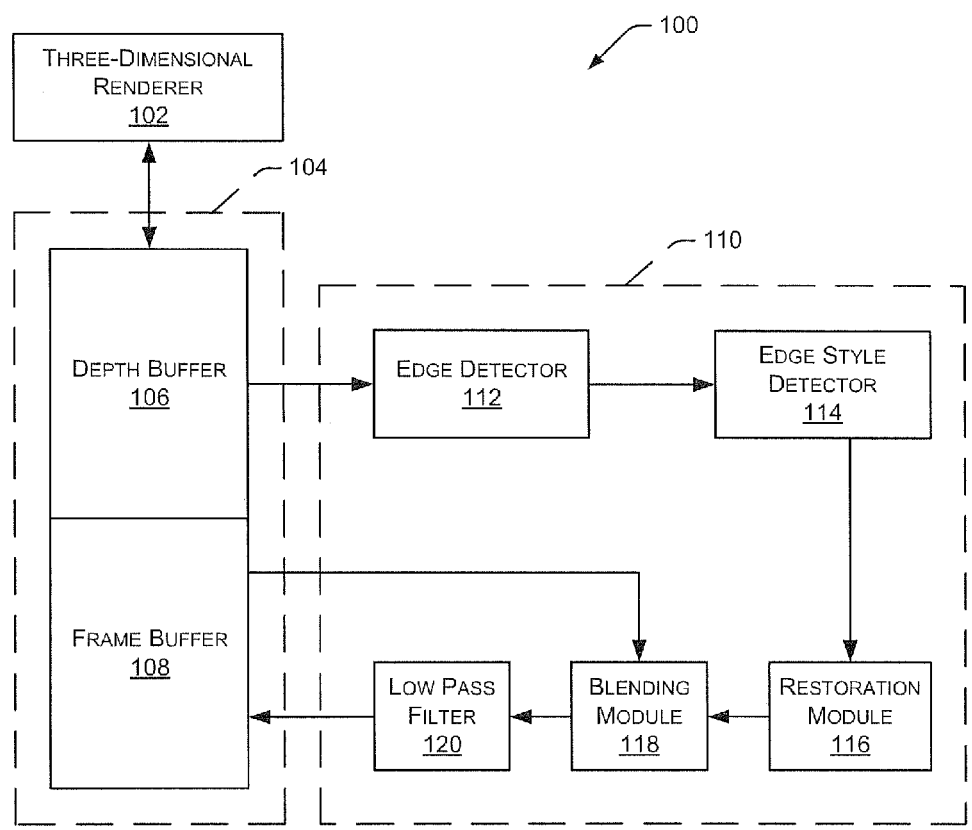
FIG. 3 depicts a schematic block diagram of an embodiment of a system capable of performing anti-aliasing using the methods and algorithms described herein.

FIG. 3 depicts a schematic block diagram of an embodiment of a system 100 capable of performing anti-aliasing using the methods and algorithms described herein. For example, system 100 can reduce aliasing of the type illustrated in FIGS. 1 and 2, as well as other examples of aliasing.

System 100 may be included within another device, such as a graphics controller, or coupled to one or more other devices, components, or systems. As used herein, "coupled" components or entities are intended to broadly include components that are physically connected, as well as components or entities that are not physically connected, but are able to communicate or otherwise transmit a signal or information.

System 100 includes a three-dimensional (3D) renderer 102, a memory device 104, and an anti-aliasing module 110. The three-dimensional renderer 102 renders (or generates) an image from data that describes one or more 3D objects. Conventional rendering techniques are well-known in the art; thus, a more detailed description of 3D rendering is not provided herein. In a particular embodiment, image data is stored in memory device 104. In this embodiment, memory device 104 includes a depth buffer 106 (also referred to as a Z-buffer) and a frame buffer 108. Depth buffer 106 contains image data associated with the "depth" of a pixel (i.e., the z coordinate). This depth information is used by three-dimensional renderer 102 in rendering 3D images. Frame buffer 108 contains image data for an entire image frame that can be communicated to a display device or other image processing device.

The anti-aliasing module 110 shown in FIG. 3 reduces or eliminates aliasing distortions in an image. Anti-aliasing module 110 includes an edge detector 112, an edge style detector 114, a restoration module 116, a blending module 118 and a low pass filter 120. Edge detector 112 reads data from depth buffer 106 and applies various edge detection procedures to detect one or more object edges within an image. Edge style detector 114 identifies an edge style associated with each object edge detected by edge detector 112. Restoration module 116 identifies pixel data associated with the detected edge and uses that pixel data to restore the detected edge. Blending module 118 performs a weighted averaging of specific pixels located near an object edge. Low pass filter 120 applies one or more filtering procedures to pixels located near an object edge. Additional details regarding operation of the components shown in FIG. 3 are discussed below.

Although system 100 is shown and described with certain components and functions, other embodiments of system 100 may include fewer or more components and may be configured to implement more or less functionality than is described herein.

Figure 4:
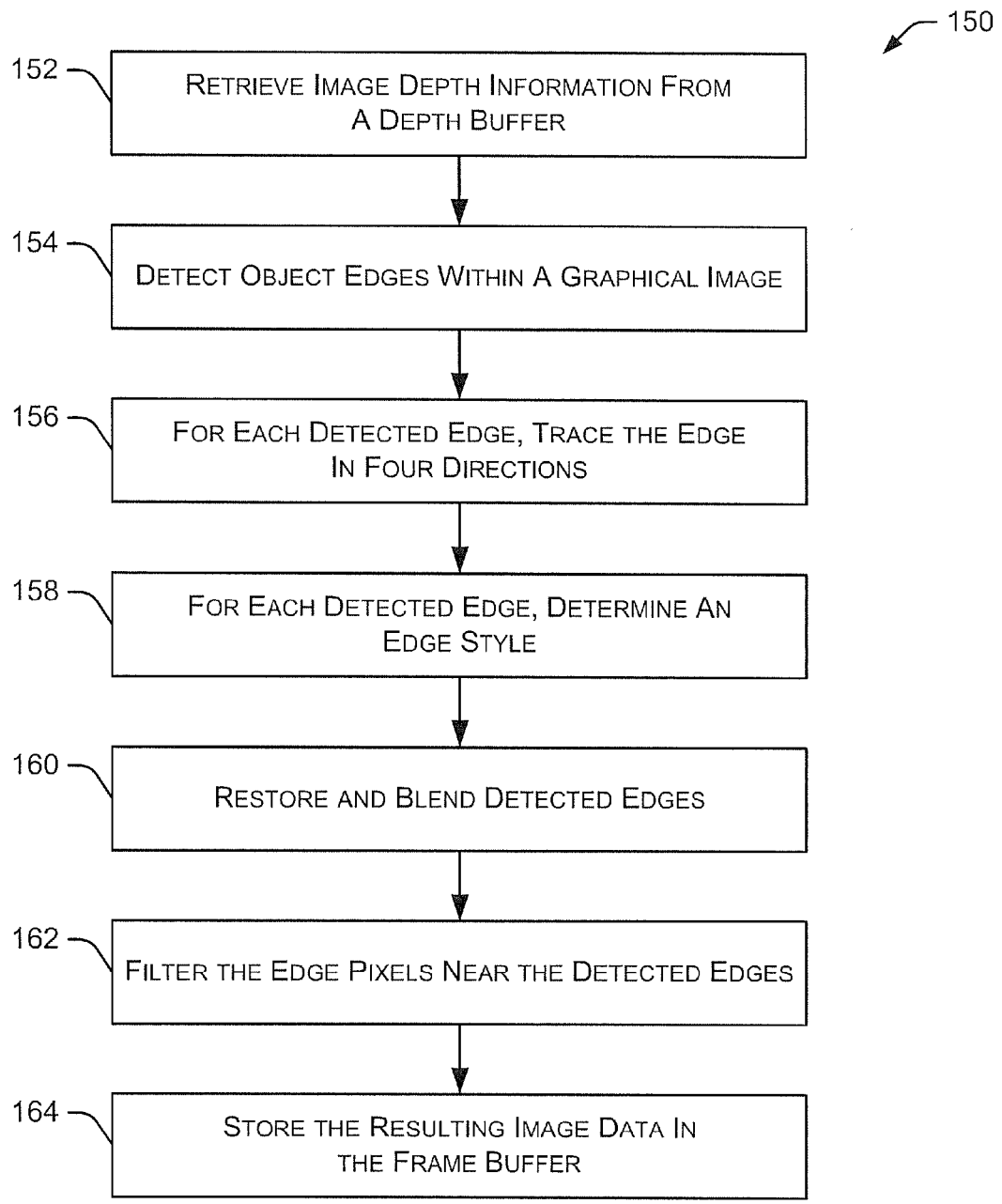
FIG. 4 depicts a flow diagram of an example procedure for reducing aliasing in graphical images.

FIG. 4 depicts a flow diagram of an example procedure 150 for reducing aliasing in graphical images. Initially, procedure 150 retrieves image depth information from a depth buffer (block 152), such as depth buffer 106 shown in FIG. 3. The retrieved image depth information is used to detect the edge of an object within a graphical image (block 154). For each detected edge, the procedure traces the edge in four directions (block 156), such as up, down, left, and right. Continuing to block 158, procedure 150 determines an edge style associated with each detected edge. Additional details regarding various edge styles are provided herein. The procedure of FIG. 4 continues by restoring and blending the detected edges (block 160) and filtering edge pixels near the detected edges (block 162). Finally, the resulting image data is stored in the frame buffer (block 164), such as frame buffer 108 shown in FIG. 3. Additional details regarding procedure 150 are discussed below.

In a particular embodiment, edge detector 112 detects object edges by considering each pixel in an image frame. Each pixel has an associated position defined as (x,y). Edges are detected in two directions (e.g., vertical and horizontal) using the following calculations.

$$DiffVert(x,y)=Z(x+1,y)+Z(x-1,y)-2*Z(x,y)$$

$$DiffHori(x,y)=Z(x,y+1)+Z(x,y-1)-2*Z(x,y)$$

In the above calculations, DiffVert(x,y) and DiffHori(x,y) represent differences in pixel values in the vertical and horizontal directions, respectively.

$$Edge(x,y)=(|DiffHori(x,y)|>EdgeZThresh?1:0)|(|DiffVert(x,y)|>EdgeZThresh?2:0)$$

$$MajorDiff(x,y,Vert)=|Z(x-1,y)-Z(x,y)|>|Z(x+1,y)-Z(x,y)|?1:0$$

$$MajorDiff(x,y,Hori)=|(x,y-1)-Z(x,y)|>|Z(x,y+1)-Z(x,y)|?1:0$$

Using the above calculations, if Edge(x,y)=0, this is not an edge. If Edge(x,y)=1, a horizontal edge is indicated at (x,y), such as a horizontal line that passes through (x,y). If Edge(x,y)=2, a vertical edge is indicated at (x,y), such as a vertical line that passes through (x,y). If Edge(x,y)=3, a horizontal/vertical edge may be present at (x,y).

Figure 5A:
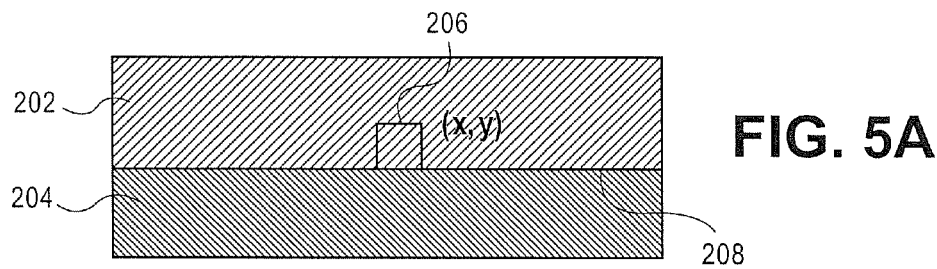
FIGS. 5A-5D depict example implementations of the procedures and calculations discussed herein.
Figure 5B:
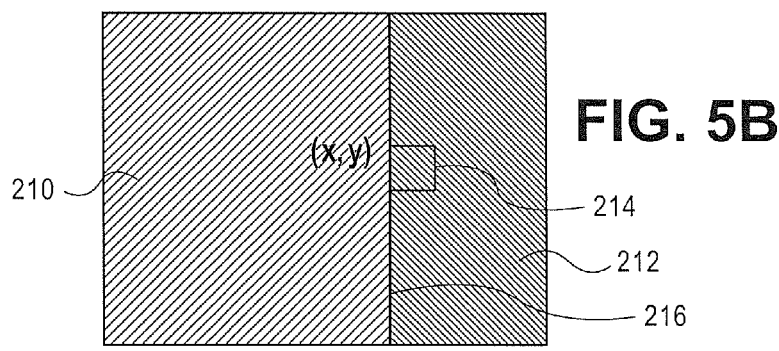
Figure 5C:
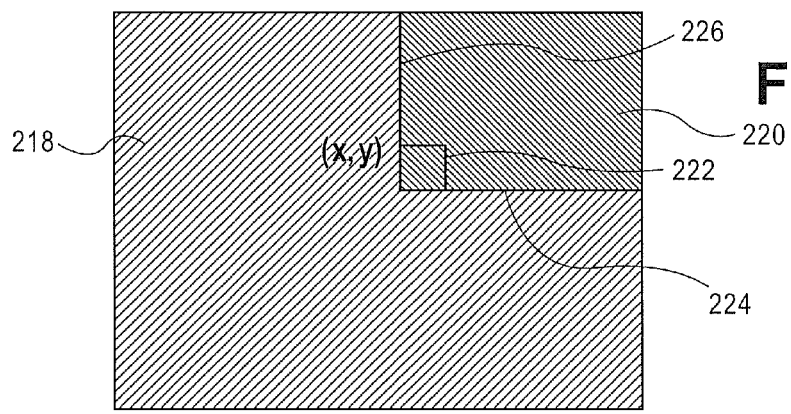
Figure 5D:
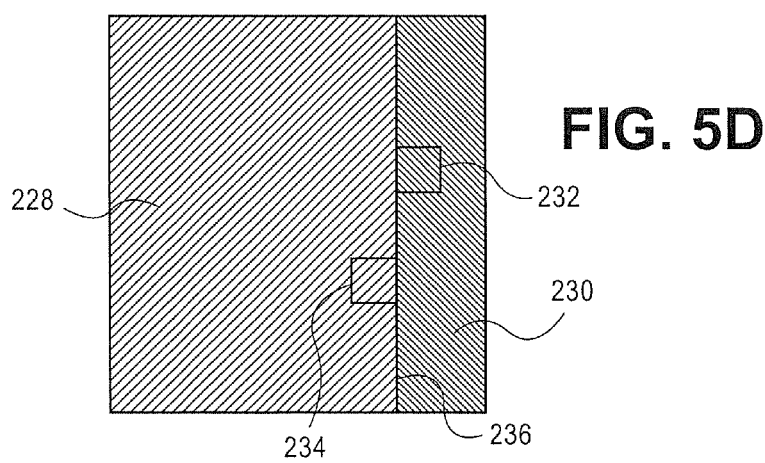

FIGS. 5A-5D illustrate example implementations of the above calculations. FIG. 5A shows an edge 208 between two objects 202 and 204. The Edge(x,y) calculation is performed at pixel 206, where Edge(x,y)=1, indicating a horizontal edge. FIG. 5B shows an edge 216 between two objects 210 and 212. The Edge(x,y) calculation is performed at pixel 214, where Edge(x,y)=2, indicating a vertical edge. FIG. 5C shows a horizontal edge 224 and a vertical edge 226 between two objects 218 and 220. The Edge(x,y) calculation is performed at pixel 222, where Edge(x,y)=3, indicating a horizontal/vertical edge. FIG. 5D shows an edge 236 between two objects 228 and 230. The MajorDiff(x,y,Vert) calculation is performed at pixels 232 and 234. At pixel 232, MajorDiff(x,y,Vert)=1, indicating that the left object 228 is different from the object (object 230) associated with the current pixel (pixel 232). At pixel 234, MajorDiff(x,y,Vert)=0, indicating that the right object 230 is different from the object (object 228) associated with the current pixel (pixel 234).

In a particular embodiment, detected edges are traced in four directions: up, down, left and right. Edges are traced to determine an edge style associated with each edge. The edge style describes the general shape or other characteristics of the edge, as described herein. Edges are traced for each pixel (x,y) where the value of Edge(x,y) (calculated above) is not zero. When comparing two pixels (x,y) and (s,t), the two pixels are defined to have the same horizontal edge style if:
DiffHori(x,y) has the same sign as DiffHori(s,t);
Edge(x,y) & 1==1;
Edge(s,t) & 1==1; and
|DiffHori(s,t)|/|DiffHori(x,y)| is in the range of (2/3, 3/2).
Similarly, two pixels are defined to have the same vertical edge style if:
DiffVert(x,y) has the same sign as DiffVert(s,t);
Edge(x,y) & 2==2;
Edge(s,t) & 2==2; and
|DiffVert(s,t)|/|DiffVert(x,y)| is in the range of (2/3, 3/2).

Figure 6A:
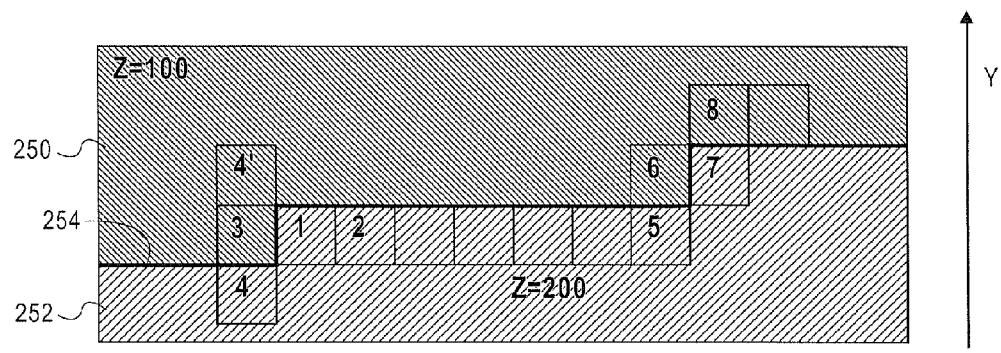
FIGS. 6A-6C depict additional example implementations of the procedures and calculations discussed herein.

FIG. 6A illustrates an example implementation using the above calculations. FIG. 6A shows two objects 250 and 252 and a corresponding edge 254. Object 250 has a pixel depth of Z=100. Object 252 has a pixel depth of Z=200. The threshold value for this example is 80. The threshold value is set by the software and is generally in the range of 80-1000. This threshold value is used to determine whether an edge is identified. Table 1 below includes DiffHori, DiffVert, MajorDiff(Hori) and MajorDiff(Vert) values for various pixels shown in FIG. 6A.

TABLE 1

| Pixel | DiffHori | DiffVert | MajorDiff(Hori) | MajorDiff(Vert) |
|---|---|---|---|---|
| 1 | −100 | −100 | 0 | 1 |
| 2 | −100 | 0 | 0 | 0 |
| 3 | 100 | 100 | 1 | 0 |
| 4 | −100 | 0 | 0 | 0 |
| 5 | −100 | 0 | 0 | 0 |
| 6 | 100 | 100 | 1 | 0 |
| 7 | −100 | −100 | 0 | 1 |
| 8 | 100 | 0 | 1 | 0 |

In this example, pixels labeled 1, 2, 4, 5 and 7 have the same horizontal edge style (i.e., located at the bottom of edge 254), and have the same DiffHori value. Pixels labeled 1, 3, 6 and 7 are associated with vertical portions of edge 254. However, pixels 6 and 7 are different edge styles (different DiffVert values). Pixels 3 and 6 are the same style and have the same DiffVert value. When MajorDiff(Hori)=1, the edge most likely occurred between (x, y−1) and (x,y). When MajorDiff(Hori)=0, the edge most likely occurred between (x,y) and (x, y+1).

When tracing a particular edge, the procedure takes "steps" along the edge until the end of the edge is reached. The process of taking one or more "steps" along an edge while tracing that edge is referred to herein as "walking" along the edge. This "walking" along an edge is performed horizontally and/or vertically, depending on the particular edge. The "walking" process may be performed in any of four directions, such as right, left, up and down. The following calculations are associated with walking horizontally—one calculation for walking left along the edge (LeftWalk), and another calculation for walking right along the edge (RightWalk).

LeftWalk(Hori)=MAX{$j$: for any $0 < i \leq j$, ($x-i,y$) and ($x-i+1, y$) that have the same Horizontal Edge Style};

RightWalk(Hori)=MAX{$j$: for any $0 < i \leq j$, ($x+i,y$) and ($x+i-1,y$) that have the same Horizontal Edge Style};

The following calculations are associated with walking vertically—one calculation for walking up along the edge, and another calculation for walking down along the edge. In this embodiment, the same terms "LeftWalk" and "RightWalk" are used as in the above calculations. In this embodiment, "LeftWalk" corresponds to walking up along the edge and "RightWalk" corresponds to walking down along the edge.

LeftWalk(Vert)=MAX{$j$: for any $0 < i \leq j$, ($x,y-i$) and ($x, y-i+1$) that have the same Vertical Edge Style};

RightWalk(Vert)MAX{$j$: for any $0 < i \leq j$, ($x,y+i$) and ($x, y+i-1$) that have the same Vertical Edge Style};

In a particular embodiment, the walk step information is calculated and accumulated as part of the edge detection process. In other embodiments, the walk step information is calculated and accumulated after the edge detection process is complete.

Referring again to the example of FIG. 6A, for pixel 2 the value of LeftWalk(Hori) is 1, indicating a left walk to pixel 1. For pixel 2, the value of RightWalk(Hori) is 5, indicating a right walk to pixel 5.

After calculating the walk step information, an edge tracing interval is calculated as follows.

EdgeInterval(Hori)=LeftWalk(Hori)+RightWalk (Hori)+1

EdgeInterval(Vert)=LeftWalk(Vert)+RightWalk (Vert)+1

In the above calculation, EdgeInterval(Hori) represents the horizontal edge tracing interval and EdgeInterval(Vert) represents the vertical edge tracing interval. The primary tracing direction is determined by comparing EdgeInterval(Hori) to EdgeInterval(Vert). If EdgeInterval(Hori) is less than EdgeInterval(Vert), then the primary tracing direction is vertical. If EdgeInterval(Hori) is greater than EdgeInterval (Vert), then the primary tracing direction is horizontal. Referring again to the example of FIG. 6A, for pixel 2, the value of EdgeInterval(Hori) is 7 (1+5+1).

At the end of a particular edge, an edge style is calculated for that particular edge. In the case of a left edge end, the edge style is calculated by checking (also referred to as "testing") the two diagonal pixels. For example, with horizontal tracing, the procedure tests for an upward edge end (UpTrace) or a downward edge end (DownTrace) as follows.

UpTrace=If ($x$−LeftWalk(Hori)−1,$y$+1) and ($x$−LeftWalk(Hori),$y$) are the same Horizontal Edge Style DownTrace=If ($x$−LeftWalk(Hori)−1,$y$−1) and ($x$−LeftWalk(Hori),$y$) are the same Horizontal Edge Style Referring again to the example of FIG. 6A, for pixel 2 and a left walk, the value of UpTrace is 0, and pixel 4 receives the same horizontal edge style as pixel 1. For pixel 2 and a left walk, the value of DownTrace is 1, and pixel 4' does not receive the same horizontal edge style as pixel 1.

The value of LeftEnd indicates whether, at the left end of the edge tracing, the edge trend is upward (LeftEnd=1), downward (LeftEnd=−1), or undecided (LeftEnd=0). In one implementation, LeftEnd is determined using the following Table.

TABLE 2

| UpTrace | DownTrace | LeftEnd |
|---|---|---|
| 0 | 0 | (Edge(x-LeftWalk(Hori) − 1, y + 1) != 0) − (Edge(x-LeftWalk(Hori) − 1, y − 1) != 0) |
| 1 | 0 | 1 |
| 0 | 1 | −1 |
| 1 | 1 | WeakLeftEnd |

Where WeakLeftEnd is defined as follows.

(MajorDiff($x$−LeftWalk(Hori)−1,$y$+1,Hori)==MajorDiff($x$−LeftWalk(Hori),$y$,Hori))−

(MajorDiff($x$−LeftWalk(Hori)−1,$y$−1,Hori)==MajorDiff($x$−LeftWalk(Hori),$y$,Hori))

Figure 6B:
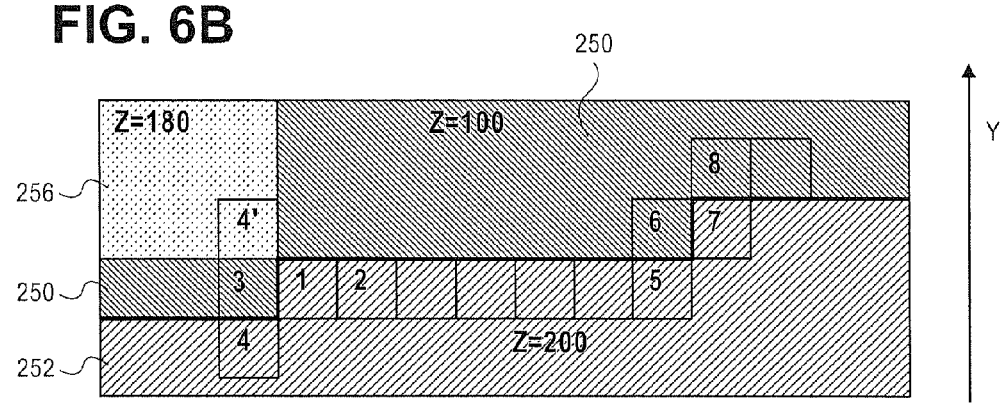

WeakLeftEnd is used in certain situations, such as when both UpTrace and DownTrace are both successful (both have a value of 1). WeakLeftEnd attempts to identify the major reason for the difference. FIG. 6B illustrates a variation of FIG. 6A, which includes a third object 256 having an associated value of Z=180. In this example, pixel 4' is associated with object 256. Table 3 below includes DiffHori and MajorDiff values for various pixels shown in FIG. 6B.

TABLE 3

| Pixel | DiffHori | MajorDiff |
|-------|----------|-----------|
| 1, 2  | −100     | 0         |
| 3     | 80       | 1         |
| 4     | −100     | 0         |
| 4'    | −80      | 1         |

In this example, pixels 1, 2, 4 and 4' have the same horizontal edge style, UpTrace and DownTrace are both 1. In this situation, the following calculation is used to determine LeftEnd (and WeakLeftEnd).

LeftEnd=WeakLeftEnd=(MajorDiff(Pixel 4,Hori)
==MajorDiff(Pixel 1,Hori))−(MajorDiff(Pixel 4',Hori)==MajorDiff(Pixel 1,Hori))=0−1=−1.

Thus, the value of LeftEnd in this example is −1.

Figure 7:
FIG. 7 depicts example edge styles that can be associated with a detected edge.
Figure 7:
Figure 7:
Figure 7:
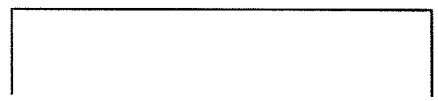

Similar procedures are used to determine a value for RightEnd for horizontal tracing. Also, similar procedures are used to determine values for LeftEnd and RightEnd in situations performing vertical tracing. When the values of LeftEnd and RightEnd are known, the edge style can be classified. FIG. 7 depicts example edge styles that can be associated with a detected edge. The examples shown in FIG. 7 include a "Down Stair", "Up Stair", "Happy Mouth" and "Sad Mouth". Additionally, a particular edge may be classified as "Flat" (not shown in FIG. 7). In a particular embodiment, the edge style is determined using the following Table.

TABLE 4

| LeftEnd | RightEnd | Edge Style  |
|---------|----------|-------------|
| 1       | 0, −1    | Down Stair  |
| 0, −1   | 1        | Up Stair    |
| 0       | 0        | Flat        |
| 1       | 1        | Happy Mouth |
| −1      | −1       | Sad Mouth   |

After the edge tracing direction and edge style are known, as well as the values of LeftWalk and RightWalk, the procedure restores and blends the detected edges. In a particular embodiment, the procedure calculates a weighted average of two pixels. The current pixel is designated as (x,y). The other pixel that is averaged with the current pixel is (x+1,y) or (x,y+1), depending on the edge tracing direction (e.g., vertical or horizontal). In one implementation, the sum of the two pixel weights is set to the value 1.0, so it is only necessary to calculate the weight on one pixel, such as (x,y). Additionally, the value of AllAreaSum is set to a value of 16. The following Table identifies a weight to be applied to a particular pixel depending on the associated edge style.

TABLE 5

| Edge Style  | Weight On Pixel (x, y) |
|-------------|------------------------|
| Up Stair    | (LeftWalk + 1) * (AllAreaSum − 1)/(EdgeInterval) + 1 |
| Down Stair  | (RightWalk + 1) * (AllAreaSum − 1)/(EdgeInterval) + 1 |
| Flat        | AllAreaSum |
| Sad Mouth   | (2*Min{LeftWalk, RightWalk} + 1) * (AllAreaSum − 1)/(EdgeInterval) + 1 |
| Happy Mouth | AllAreaSum − (Sad Mouth Weight Formula) |

The other pixel weight=AllAreaSum−weight on pixel (x,y). The weighted average of the two pixels is calculated as follows:

Weighted Average=((Weight On(x,y))*PixelValue(x, y)+(Weight On Other Pixel)*OtherPixelValue)/AllAreaSum This weighted average value is used to restore and blend the detected edge.

Figure 6C:
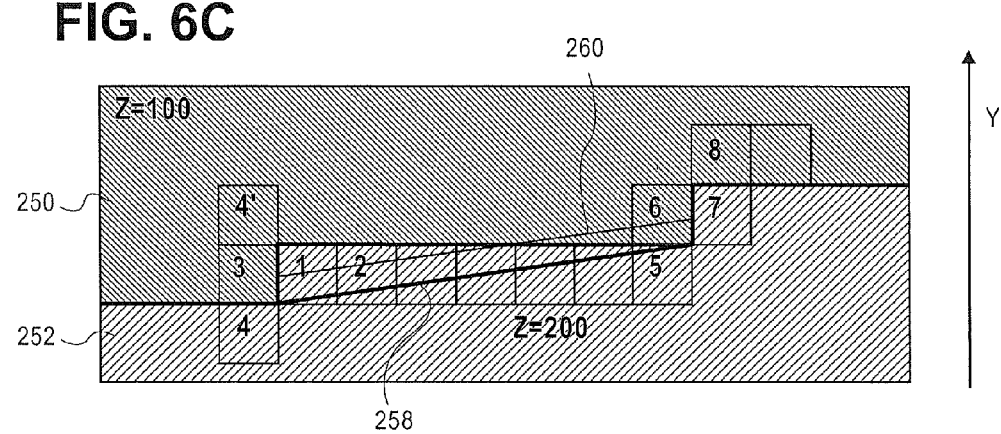

FIG. 6C illustrates another variation of FIG. 6A, which includes two additional lines 258 and 260, discussed below. In this example, pixel 2 has a horizontal edge style of "up stair". For purposes of discussion, line 258 is considered as a "restored edge" for the objects shown in FIG. 6C. An "ideal restored edge" is illustrated as line 260. However, this "ideal restored edge" causes some pixels (e.g., pixels 1 and 2) to blend with the "up" pixel and some pixels (e.g., pixel 6) to blend with the "down" pixel.

Line 258 in FIG. 6C provides the separation between objects 250 and 252. The balance between objects 250 and 252 with respect to line 258 changes as the line moves from pixel 1 to pixel 5. For example, the majority of pixel 1 is associated with object 250, and less of pixel 2 is associated with object 250. At pixel 5, the majority of the pixel is associated with object 252. The following calculation is used to determine the area of object 250 on pixels 1, 2 and 5.

Area=(0.5+LeftWalk)/EdgeInterval

A similar calculation is used with a "down stair" edge, but LeftWalk is replaced with RightWalk. When the edge is a "sad mouth" style, the edge can be treated as a combination of an "up stair" edge (when LeftWalk<RightWalk) and a "down stair" (when RightWalk>=LeftWalk). Table 6 below is a variation of Table 5, in which AllAreaSum represents the entire area of a pixel.

TABLE 6

| Edge Style  | Weight On Pixel (x, y) |
|-------------|------------------------|
| Up Stair    | (0.5 + LeftWalk) * AllAreaSum/EdgeInterval |
| Down Stair  | (0.5 + RightWalk) * AllAreaSum/EdgeInterval |
| Flat        | AllAreaSum |
| Sad Mouth   | (2*Min{LeftWalk, RightWalk} + 0.5) * AllAreaSum/EdgeInterval |
| Happy Mouth | AllAreaSum − (Sad Mouth Weight Formula) |

In a particular implementation, the weight is set to AllAreaSum if EdgeInterval<3 for "up stair" and "down stair" edges because the edge is generally too short to process. Additionally, the weight may be set to AllAreaSum if EdgeInterval<5 for "happy mouth" and "sad mouth" edges.

Figure 8:
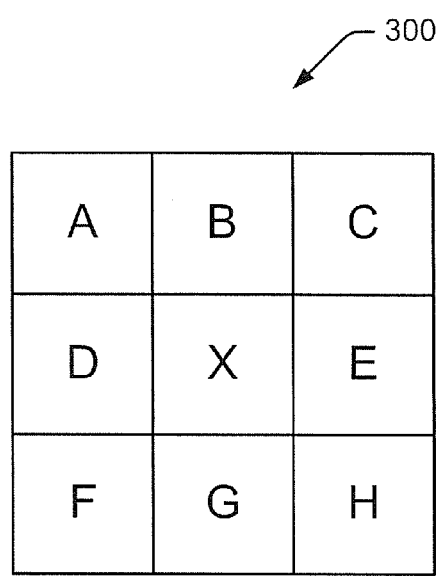
FIG. 8 depicts an example arrangement of a plurality of pixels contained in a graphical image.

FIG. 8 depicts an example arrangement of a plurality of pixels 300 contained in a graphical image. The example of FIG. 8 includes a current pixel X and neighboring pixels A, B, C, D, E, F, G and H). After restoring and blending the detected edge, a low pass filter (e.g., low pass filter 120 in FIG. 3) is applied to the edge pixel (or current pixel). In one embodiment, all weighted pixel values including and surrounding the edge pixel are filtered. Referring to FIG. 8, all pixel values (A, B, C, D, E, F, G, H and X) in this filtering embodiment are weighted pixel values. This embodiment typically provides a high quality result from the low pass filter since all pixel values are weighted pixel values.

In an alternate embodiment, only the weighted pixel value for the center pixel (X) is used in the filtering process. The other pixel values (A, B, C, D, E, F, G and H) have their original value. This embodiment typically requires less computational resources since only one weighted pixel value is calculated.

Typically, the low pass filtering process is applied to edge pixels. However, in a particular implementation, if pixel X is not an edge pixel, but pixels B, D, E and G are all edge pixels, then the low pass filter is applied to pixel X.

Embodiments of the system and method described herein facilitate improved anti-aliasing compared to conventional anti-aliasing techniques. Additionally, some embodiments may be used in conjunction with one or more conventional anti-aliasing techniques.

Embodiments of the invention also may involve a number of functions to be performed by a computer processor, such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that are used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A system to reduce aliasing in a graphical image, the system comprising:
   an edge detector configured to read image depth information from a depth buffer and to apply edge detection procedures to detect an object edge within the image;
   an edge style detector configured to identify a first edge end and a second edge end, the edge style detector further to identify an edge style associated with the detected object edge based on the first edge end and a second edge end;
   a restoration module configured to identify pixel data associated with the detected edge; and
   a blending module configured to generate weighted pixel data based on the pixel data associated with the detected edge according to a weighting function corresponding to the identified edge style and blend the weighted pixel data associated with the detected edge.

2. The system of claim 1, further comprising a low pass filter configured to apply a filtering procedure to pixels located near the detected edge.

3. The system of claim 1, the edge detector further to detect pixels along an object edge in two directions.

4. The system of claim 1, the edge detector further to trace an object edge in multiple directions.

5. The system of claim 1, the edge style detector further to detect a first edge end style and a second edge end style.

6. The system of claim 1, the blending module further to calculate a weighted average for two adjacent pixels.

7. A method comprising:
   receiving, by a computer system, image depth information associated with a graphical image from a depth buffer;
   detecting, by the computer system, an object edge within the graphical image based on the depth information associated with the graphical image;
   tracing, by the computer system, the object edge to identify a first edge end and a second edge end;
   identifying, by the computer system, an edge style associated with the object edge based on the first edge end and the second edge end; and
   restoring, by the computer system, the object edge based on the edge style associated with the object edge by generating weighted pixel data based on pixel data associated with the object edge according to a weighting function corresponding to the identified edge style and blending the object edge using the weighted pixel data.

8. The method according to claim 7, further comprising blending pixel data associated with the object edge.

9. The method according to claim 7, further comprising filtering pixel data associated with the object edge.

10. The method according to claim 9, wherein the filtering includes applying a low pass filter procedure to the pixel data associated with the object edge.

11. The method according to claim 7, wherein tracing the object edge includes tracing the object edge in two directions.

12. The method according to claim 7, wherein tracing the object edge includes detecting pixels along the object edge in at least two directions.

13. The method according to claim 7, further comprising calculating a weighted average for adjacent pixels near the object edge.

14. The method according to claim 7, further comprising storing the resulting image data in a frame buffer.

15. A computer-readable storage medium embodying a program of machine-readable instructions, executable by a processor, to perform operations to reduce image aliasing, the operations comprising:
    access data stored to represent the image;
    apply edge detection procedures to detect an edge within the image based on depth information associated with the image;
    trace the edge to identify a first edge end and a second edge end;
    identify an edge style associated with the edge based on the first edge end and the second edge end;
    generate weighted pixel data for pixel data associated with the edge according to a weighting function corresponding to the identified edge style; and
    restore the edge by blending the edge based on the weighted pixel data.

16. The computer-readable storage medium of claim 15, the operations further to blend pixel data associated with the edge.

17. The computer-readable storage medium of claim 15, the operations further to filter pixel data associated with the edge.

18. The computer-readable storage medium of claim 15, the operations further to apply a low pass filter to pixel data associated with the edge.

19. The computer-readable storage medium of claim 15, the operations further to detect pixels along the edge in a plurality of directions.

20. The computer-readable storage medium of claim 15, the operations further to calculate a weighted average for adjacent pixels near the edge.

\* \* \* \* \*